United States Patent
Stubbs et al.

(10) Patent No.: US 10,136,656 B2
(45) Date of Patent: Nov. 27, 2018

(54) SYSTEMS AND METHODS FOR PROVIDING A FOOD PRODUCT WITH ADDITIVES

(75) Inventors: Timothy A. Stubbs, Glenview, IL (US);
Kent M. Bearson, Naperville, IL (US);
Paul H. Bernthal, South Elgin, IL (US); Dejing Fu, Lisle, IL (US); John Dow Harris, Jr., Joliet, IL (US);
Kristina J. Phipps, Elmhurst, IL (US);
Barbara K. Schmitt, Downers Grove, IL (US); Glenn Wille, Oswego, IL (US)

(73) Assignee: The Hillshire Brands Company, Chicago, IL (US)

( * ) Notice: Subject to any disclaimer, the term of this patent is extended or adjusted under 35 U.S.C. 154(b) by 574 days.

(21) Appl. No.: 13/251,010

(22) Filed: Sep. 30, 2011

(65) Prior Publication Data

US 2012/0107464 A1    May 3, 2012

Related U.S. Application Data

(60) Provisional application No. 61/389,032, filed on Oct. 1, 2010.

(51) Int. Cl.
*A22C 11/10* (2006.01)
*A22C 11/02* (2006.01)
(Continued)

(52) U.S. Cl.
CPC ............ *A22C 11/029* (2013.01); *A22C 13/00* (2013.01); *A23L 13/03* (2016.08); *A23P 20/12* (2016.08);
(Continued)

(58) Field of Classification Search
CPC ............ A22C 13/00; A22C 2013/0046; A22C 13/130003; A22C 13/0013; A22C 13/02; A22C 2013/0053; A22C 2013/002; A22C 11/00; A22C 2013/0023; A22C 13/0003; A22C 11/0209; A22C 11/0227; A23L 1/3103; A23L 1/31; A23L 1/314; A23L 1/317; A23L 1/3172; A23L 1/3175;
(Continued)

(56) References Cited

U.S. PATENT DOCUMENTS

| RE28,281 E | 12/1974 | Bridgeford |
|---|---|---|
| 4,377,187 A | 3/1983 | Chiu |

(Continued)

FOREIGN PATENT DOCUMENTS

| EP | 0 741 973 | 11/1996 |
|---|---|---|
| WO | WO-99/22600 | 5/1999 |
| WO | WO-99/60870 | 12/1999 |

OTHER PUBLICATIONS

Dransfield, Rob and Dave Needham, AS Level for OCR Applied Business, Heinemann Educational Publishers, 2005, p. 336.*

(Continued)

*Primary Examiner* — Hong Thi Yoo
(74) *Attorney, Agent, or Firm* — Duane Morris LLP (57) ABSTRACT

A food product includes a first extruded component, a second extruded component co-extruded over the first component, the second component comprising a meat component and an additive, and a casing provided over the second component, wherein the additive comprises at least one of a flavoring, a seasoning, and a coloring.

17 Claims, 9 Drawing Sheets

(51) Int. Cl.
- *A22C 13/00* (2006.01)
- *A23P 20/12* (2016.01)
- *A23P 20/18* (2016.01)
- *A23P 30/25* (2016.01)
- *A23L 13/00* (2016.01)

(52) U.S. Cl.
CPC .............. *A23P 20/18* (2016.08); *A23P 30/25* (2016.08); *A22C 2013/0046* (2013.01)

(58) Field of Classification Search
CPC . A23L 1/22; A23L 1/221; A23L 13/65; A23L 13/62; A23L 13/03; A23B 4/00; A23B 4/10; A23P 1/00; A23P 1/08; A23P 1/10; A23P 1/12
USPC ......... 426/237, 92, 442, 284, 302, 289, 106, 426/105, 135; 425/104; 428/34.8, 35.7
See application file for complete search history.

(56) References Cited

U.S. PATENT DOCUMENTS

| | | | |
|---|---|---|---|
| 4,377,606 A | 3/1983 | Chiu | |
| 4,442,868 A | 4/1984 | Smith et al. | |
| 4,504,500 A | 3/1985 | Schneck et al. | |
| 4,505,939 A | 3/1985 | Chiu | |
| 4,609,559 A | 9/1986 | Nicholson | |
| 4,867,204 A | 9/1989 | Ellis et al. | |
| 4,949,430 A | 8/1990 | Stanek | |
| 4,958,412 A | 9/1990 | Stanek | |
| 5,030,464 A | 7/1991 | Hansen et al. | |
| 5,185,189 A | 2/1993 | Stenger et al. | |
| 5,219,002 A | 6/1993 | Stenger et al. | |
| 5,238,442 A * | 8/1993 | Townsend | A22C 11/029 452/27 |
| 5,270,067 A | 12/1993 | Underwood et al. | |
| 5,484,001 A | 1/1996 | Gray | |
| 5,514,400 A | 5/1996 | Gray | |
| 5,705,214 A | 1/1998 | Ito et al. | |
| 5,794,779 A | 8/1998 | Weinheimer et al. | |
| 5,811,162 A | 9/1998 | Hammer et al. | |
| 5,888,130 A | 3/1999 | Weinheimer et al. | |
| 5,928,705 A | 7/1999 | Matthews et al. | |
| 5,928,738 A | 7/1999 | Auf Der Heide et al. | |
| 5,951,390 A | 9/1999 | Kobussen et al. | |
| 5,951,943 A | 9/1999 | Auf Der Heide et al. | |
| 5,992,345 A | 11/1999 | Lange et al. | |
| 5,993,868 A | 11/1999 | Townsend | |
| 6,033,618 A | 3/2000 | Gord et al. | |
| 6,042,466 A | 3/2000 | Matthews et al. | |
| 6,048,917 A | 4/2000 | Hammer et al. | |
| 6,194,040 B1 | 2/2001 | Delius et al. | |
| 6,235,302 B1 | 5/2001 | Mans et al. | |
| 6,306,446 B1 | 10/2001 | Matthews et al. | |
| 6,485,802 B1 | 11/2002 | Hammer et al. | |
| 6,610,783 B2 | 8/2003 | Delius et al. | |
| 6,623,773 B2 | 9/2003 | Meier et al. | |
| 6,627,282 B2 | 9/2003 | Hammer et al. | |
| 6,656,547 B2 | 12/2003 | Hammer et al. | |
| 6,660,315 B2 | 12/2003 | Miller et al. | |
| 6,667,082 B2 | 12/2003 | Bamore et al. | |
| 6,703,058 B1 | 3/2004 | Hammer et al. | |
| 6,749,912 B2 | 6/2004 | Delius et al. | |
| 6,761,944 B1 | 7/2004 | Hammer et al. | |
| 6,797,100 B1 | 9/2004 | Gord et al. | |
| 6,808,771 B2 | 10/2004 | Auf Der Heide et al. | |
| 6,821,588 B1 | 11/2004 | Hammer et al. | |
| 6,821,591 B2 | 11/2004 | Gord et al. | |
| 6,902,783 B1 | 6/2005 | Hammer et al. | |
| 6,919,112 B2 | 7/2005 | Delius | |
| 7,001,635 B2 | 2/2006 | Merritt et al. | |
| 7,011,858 B2 | 3/2006 | Grolig et al. | |
| 7,022,357 B2 | 4/2006 | Krallmann et al. | |
| 7,044,845 B2 | 5/2006 | Coutandin et al. | |
| 7,059,102 B2 * | 6/2006 | Hanten | A22C 13/0003 53/450 |
| 7,189,667 B1 | 3/2007 | Mans et al. | |
| RE39,943 E | 12/2007 | Kobussen et al. | |
| 2002/0039611 A1 | 4/2002 | Gerhard et al. | |
| 2002/0064580 A1 | 5/2002 | Gord et al. | |
| 2002/0088735 A1 | 7/2002 | Weinheimer et al. | |
| 2003/0031765 A1 | 2/2003 | Luthra et al. | |
| 2003/0062649 A1 | 4/2003 | Hammer et al. | |
| 2004/0091586 A1 | 5/2004 | Hammer et al. | |
| 2004/0130060 A1 | 7/2004 | Hammer et al. | |
| 2004/0142127 A1 | 7/2004 | Delius et al. | |
| 2004/0166209 A1 | 8/2004 | Gord et al. | |
| 2004/0219264 A1 | 11/2004 | Schafer | |
| 2004/0247752 A1 | 12/2004 | Koenig et al. | |
| 2005/0106294 A1 | 5/2005 | Stalberg et al. | |
| 2005/0112247 A1 | 5/2005 | Stalberg et al. | |
| 2005/0129813 A1 | 6/2005 | Koenig et al. | |
| 2005/0186309 A1 | 8/2005 | Gord et al. | |
| 2005/0202130 A1 | 9/2005 | Auf Der Heide et al. | |
| 2006/0003058 A1 | 1/2006 | Koenig et al. | |
| 2006/0051466 A1 | 3/2006 | Delius et al. | |
| 2006/0057258 A1 | 3/2006 | Dinh-Sybeldon et al. | |
| 2006/0073245 A1 | 4/2006 | Hammer et al. | |
| 2006/0110502 A1 | 5/2006 | Auf Der Heide et al. | |
| 2006/0127538 A1 | 6/2006 | Appleby | |
| 2006/0134279 A1 | 6/2006 | Rieser et al. | |
| 2006/0153953 A1 | 7/2006 | Gord et al. | |
| 2006/0182851 A1 | 8/2006 | Kastl | |
| 2006/0188615 A1 | 8/2006 | Wilfer et al. | |
| 2006/0202397 A1 | 9/2006 | Stalberg et al. | |
| 2006/0233985 A1 | 10/2006 | Pockat et al. | |
| 2006/0234611 A1 | 10/2006 | Delius et al. | |
| 2006/0251773 A1 * | 11/2006 | Auf Der Heide et al. ... 426/138 | |
| 2006/0257532 A1 | 11/2006 | Lample et al. | |
| 2006/0269705 A1 | 11/2006 | Niederstaetter et al. | |
| 2006/0286913 A1 | 12/2006 | Niederstaetter et al. | |
| 2007/0014899 A1 | 1/2007 | Wolf | |
| 2007/0031620 A1 | 2/2007 | Auf Der Heide et al. | |
| 2007/0154601 A1 | 7/2007 | Foegler et al. | |
| 2007/0160783 A1 | 7/2007 | Rieser et al. | |
| 2007/0166489 A1 | 7/2007 | Foegler et al. | |
| 2007/0172558 A1 | 7/2007 | Hammer et al. | |
| 2007/0190210 A1 | 8/2007 | Koenig et al. | |
| 2007/0202222 A1 | 8/2007 | Koenig et al. | |
| 2008/0003336 A1 | 1/2008 | Schafer | |
| 2008/0020105 A1 | 1/2008 | Rieser et al. | |
| 2008/0057235 A1 | 3/2008 | Foegler et al. | |
| 2008/0069985 A1 | 3/2008 | Seelgen et al. | |
| 2008/0145576 A1 | 6/2008 | Koenig et al. | |
| 2008/0182035 A1 | 7/2008 | Samuels | |
| 2008/0187735 A1 | 8/2008 | Hammer et al. | |
| 2008/0226853 A1 | 9/2008 | Bueker et al. | |
| 2008/0233246 A1 | 9/2008 | Hammer et al. | |
| 2008/0248268 A1 | 10/2008 | Delius et al. | |
| 2008/0261500 A1 | 10/2008 | Fogler et al. | |
| 2008/0274237 A1 | 11/2008 | Hammer et al. | |
| 2008/0280021 A1 | 11/2008 | Hammer et al. | |
| 2009/0029012 A1 | 1/2009 | Foegler et al. | |
| 2009/0136696 A1 | 5/2009 | Faltermeier et al. | |
| 2009/0155430 A1 * | 6/2009 | Lee et al. ....................... 426/284 | |
| 2009/0162502 A1 | 6/2009 | Bueker et al. | |
| 2009/0191315 A1 | 7/2009 | Delius | |
| 2009/0211711 A1 | 8/2009 | Auf Der Heide et al. | |
| 2009/0288791 A1 | 11/2009 | Hammer et al. | |
| 2010/0015299 A1 | 1/2010 | Borst et al. | |
| 2010/0034932 A1 | 2/2010 | Schmidt et al. | |
| 2010/0047400 A1 * | 2/2010 | Carlson et al. ................. 426/92 | |
| 2010/0047417 A1 | 2/2010 | Wilfer | |
| 2010/0129505 A1 | 5/2010 | Hayes et al. | |

OTHER PUBLICATIONS

Townsend Further Processing, "QX System" brochure, copyright date of 2010, 12 pages.

International Search Report for PCT/US2011/054239, dated Apr. 19, 2012, 4 pages.

* cited by examiner

| Film properties | Application Techniques | | | | | |
|---|---|---|---|---|---|---|
| | Co-Extrusion | Smearing<br>At stuffing horn (tubular casing)<br>Roll printing (flat casing) | Flood coat<br>"P-trap" design<br>at stuffing horn | Spray | Sift / Meter | Lamination |
| Corona Treatment (air plasma) | | Thick liquids<br>Sticky Liquids<br>Film<br>Instant Dry | Thick liquids | Thick liquids<br>Sticky Liquids<br>Film<br>Sticky liquid+powder | Sift / Meter | Lamination |
| Scoring / scuff | | Liquid<br>Film | | | | Film |
| Stickiness / Food-grade Adhesive | | Food-grade adhesive | | Food-grade adhesive | | |
| Addition of primer layer | | Liquid | | | | Film |
| Electrostatic charge | | | | | Powder | Film |
| None | Liquid | Film | | | Powder | |
| | | | | | | Film |

SYSTEMS AND METHODS FOR PROVIDING A FOOD PRODUCT WITH ADDITIVES

CROSS-REFERENCE TO RELATED PATENT APPLICATIONS

This application claims the benefit of U.S. Provisional Application No. 61/389,032, filed Oct. 1, 2010, which is incorporated herein by reference in its entirety.

BACKGROUND

The present disclosure generally relates to systems and methods for providing a food product and/or food product casing with additives, and more specifically, to systems and methods for adding functional additives such as smoke and/or color additives to a food product and/or food product casing in-line (e.g., as part of a continuous flow process) during a stuffing process for the food product.

SUMMARY

One embodiment relates to a method of making a food product, the method comprising providing a food component; providing a casing material in the form of a sheet material; applying an additive to a surface of the casing material; forming a casing by forming the casing material into a tubular shape; and stuffing the food component into the casing such that at least a portion of the additive is transferred to the food component and is consumable with the food component. Alternatively, the casing may be formed prior to application of the additive to the casing material.

Another embodiment relates to a food product comprising a first extruded component; a second extruded component co-extruded over the first component, the second component comprising a meat component and an additive; and a casing provided over the second component; wherein the additive comprises at least one of a flavoring, a seasoning, and a coloring.

Another embodiment relates to an apparatus for delivering an additive to a food product, the apparatus comprising an extrusion device configured to extrude at least one food product, the food product configured to be received within a casing; and an additive delivery device configured to deliver an additive to the casing and/or the food component in a continuous manner while the food component is received within the casing.

Another embodiment relates to a method of making a food product, the method comprising providing a casing material; extruding a food component such that the food component is received within the casing material; and applying an additive to a surface of the casing material in a continuous manner as the food component is received within the casing material; wherein at least a portion of the additive is transferred from the casing material to the food component after the food component is received within the casing material and is consumable with the food component.

DETAILED DESCRIPTION OF EXEMPLARY EMBODIMENTS

General Overview

Before proceeding to the detailed description of the exemplary embodiments, several comments can be made about the general applicability of and the scope thereof. As used in this disclosure, "food product" includes whole, ground, blended, and/or emulsified products (e.g., protein-based products) such as meat, non-meats, etc. that may take a variety of forms, such as links, rings, or logs (e.g., sausage, bratwurst, hot dogs, wieners, meatloaf, lunch meats, salami etc.), and that may be provided with an outer casing, or packaging (e.g., a film or wrap).

Various embodiments disclosed herein illustrate systems and methods for delivering an additive to a food product. More specifically, various systems and methods are illustrated where an additive is provided as part of a thin layer of meat emulsion or similar product that is co-extruded with an inner core or base material of food product, and a casing (e.g., a plastic or fibrous casing) is applied to the outside of the food product. In other embodiments, a roll of film (e.g., sheet stock) is formed into a casing material, and an additive is applied to the film "in-line" (e.g., either before or after the film is formed into the casing) with a stuffing process where a food component is stuffed into the casing. In one embodiment, the additive is delivered after a film is formed into a tubular casing. In other embodiments, the additive may be applied to the film prior to forming the film into a tubular casing.

Figures 1, 2:
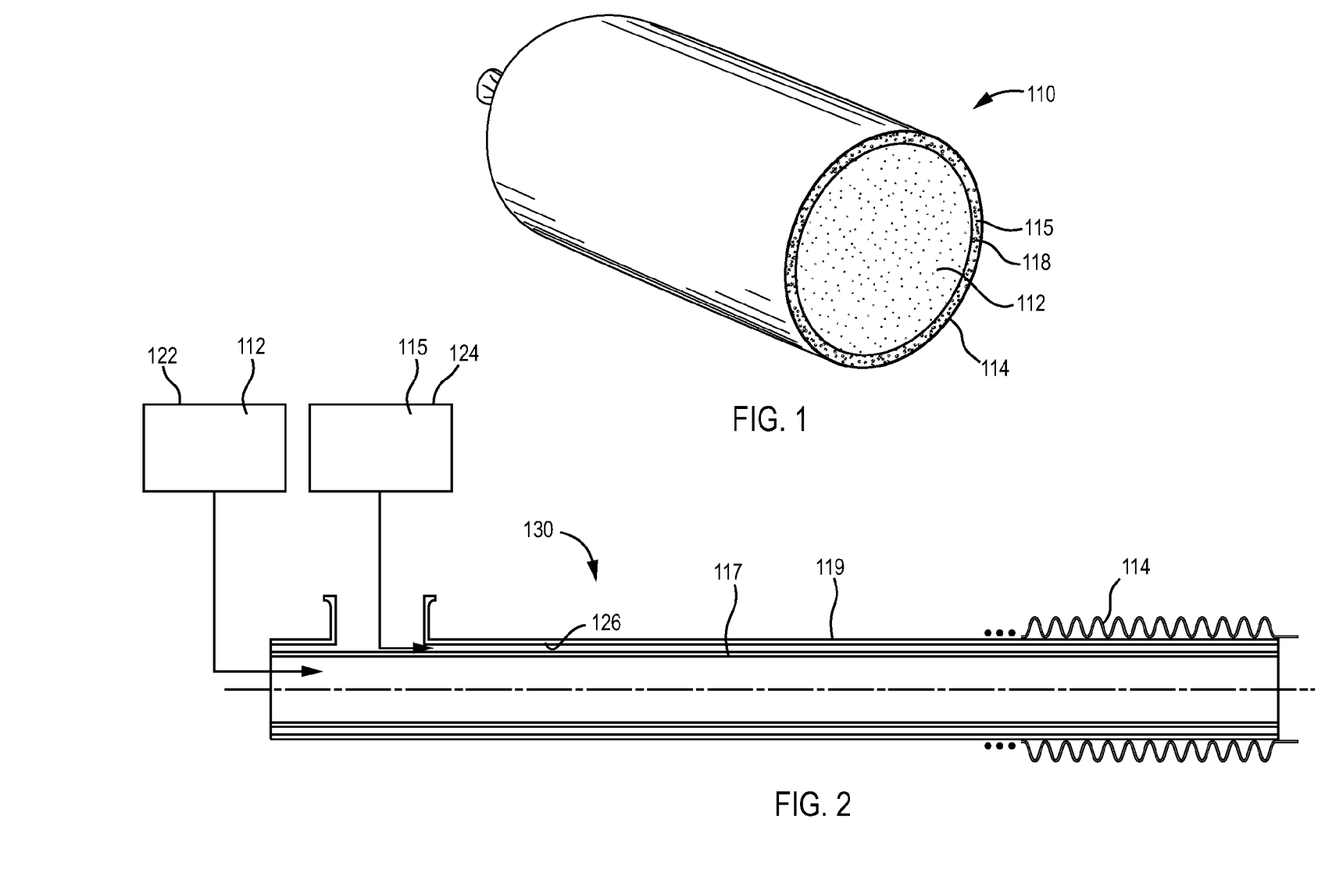
FIG. 1 is an illustration of a food product according to an exemplary embodiment.
FIG. 2 is schematic representation of an apparatus usable in making food products such as the food product of FIG. 1 according to an exemplary embodiment.

Referring to FIG. 1, a food product 110 is shown according to an exemplary embodiment. Food product 110 includes a base, or first, component 112 (e.g., a core or inner component, etc.), a second, or outer, component 115 (e.g., a carrier component, etc.), and a casing 114 (e.g., a plastic or fibrous casing, a permeable or non-permeable casing, etc.). Second component 115 may include an additive 118 (e.g., flavoring, seasoning, coloring, anti-microbial, etc.) provided in liquid, solid, and/or semi-solid form.

First component 112 may be any of a variety of food components (e.g., meat, soy, or other protein, etc.) The meat may be emulsified meat, whole muscle meat components, ground meat, or other meat variations. First component 112 may be in the shape of an elongated mass (e.g., a log, loaf, segment, link, etc.) and may be configured to be sold whole or in sliced form.

Second component 115 may be a protein or meat-based component, and may include one or more additives 118. Alternatively, second component 115 may be a fat component, sticky liquid, etc. Additives 118 may be provided as a solid (e.g., particulate, powder, etc.), semi-solid (e.g., paste, etc.) or liquid and may include flavorings, seasonings, colorings, ant-microbial agents, liquid smoke (e.g., condensed natural smoke, etc.), colorings / flavorings, and the like. In one embodiment, second component 115 comprises a ground meat that is blended with color, smoke, seasonings, etc. Other types of additives 118 may be used with second component 115 according to various exemplary embodiments. In some embodiments, second component 115 is a thin meat-based layer configured to act as a carrier for additive 118 and to substantially surround first food product 112. In some embodiments, first and second components 112, 115 may be generally concentric. In other embodiments, first component 112 may be "offset" relative to the center of second component 115.

Additives 118 may be mixed into second component 115 prior to co-extruding food product 110. For example, additive 118 may be mixed with second component 115 in a blender or similar suitable mixing device 124 prior to directing second component 115 into an extrusion device such as device 130 shown in FIG. 2.

According to an exemplary embodiment, food product 110 may be produced using a co-extrusion device such as device 130 shown in FIG. 2. First component 112 may be pumped from a blender 122 to an inner supply tube 117. An outer supply tube 119 is provided about inner supply tube 117 to form an annular supply tube 126 extending longitudinally between inner supply tube 117 and outer supply tube 119. Second component 115 is pumped from a blender 124 to annular supply tube 126. A casing 114 may be provided (e.g., shined, or alternatively formed around a horn as shown in FIG. 3) about outer supply tube 119, such that as first component 112 exits inner supply tube 117 and second component 115 exits annular supply tube 126, casing 114 is pushed off of outer supply tube 119 and receives first and second components 112, 115 as they exit device 130.

Figure 3:
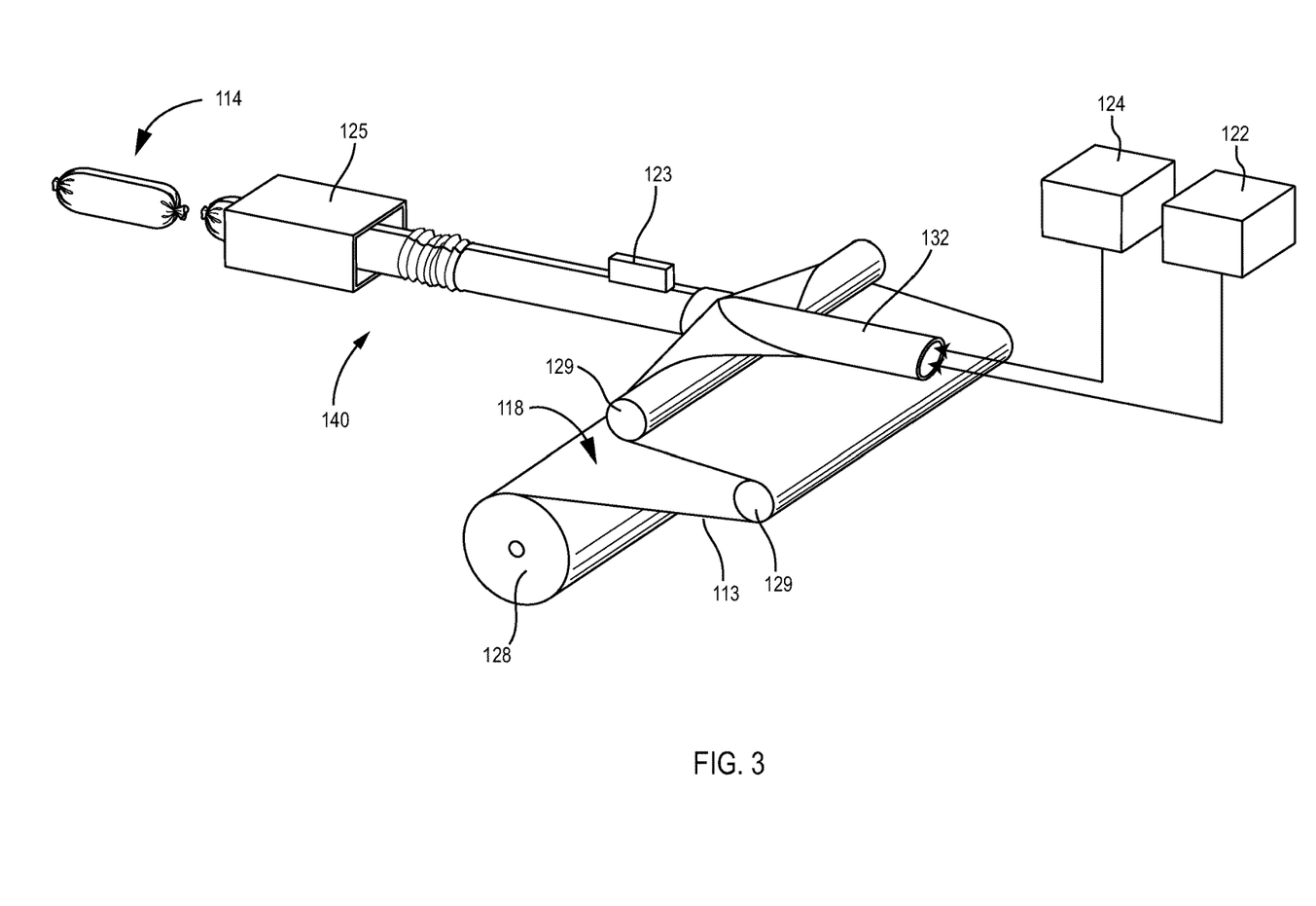
FIG. 3 is a perspective view of an apparatus usable in making food products such as the food product of FIG. 1 according to another exemplary embodiment.

According to various alternative embodiments, rather than casing 114 being provided as a shined casing on outer tube 119, casing 114 may be formed from a sheet of material or film such as film 113 as shown with device 140 illustrated in FIG. 3. As shown in FIG. 3, film 113 is supplied on a roll 128 and then transferred via a number of intermediate rollers 129 to a forming shoulder 132. Forming shoulder 132 forms the tubular shape of the casing, after which the edges of the film may be sealed together at a sealing device 123 (e.g., using any suitable method, including those discussed with respect to FIGS. 6-7) to form casing 114. Individual food products 110 may then be cut and clipped at device 125.

Figure 4:
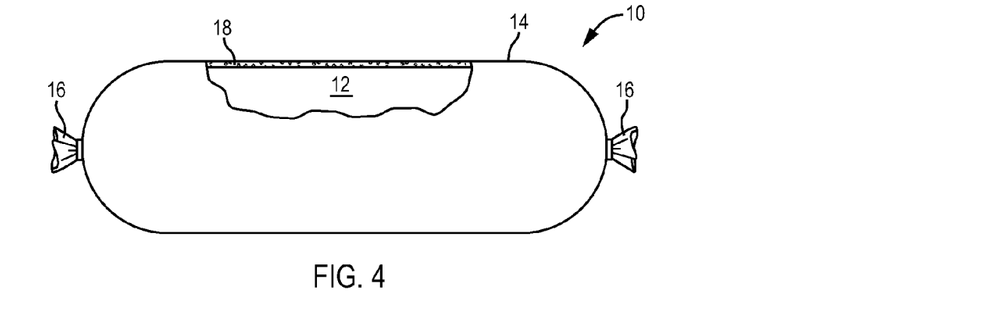
FIG. 4 is an illustration of a food product according to another exemplary embodiment.

Referring now to FIG. 4, a food product 10 is shown according to an exemplary embodiment and includes a food component 12 (e.g., a meat or non-meat based food component or dough, etc.) provided within a casing 14 (e.g., a film or barrier film, packaging, wrapper, etc.). The ends of casing 14 may be sealed (e.g., tied, sealed, etc.) at seal portions 16 to retain food component 12 within casing 14. An additive 18 (e.g., a coating, etc.) is provided between food component 12 and casing 14 (e.g., on an inner surface of casing 14) such that at least a portion of additive 18 is transferred to the surface and/or absorbed into the interior of food component 12. Casing 14 may or may not remain on food component 12 for the sale to and/or consumption of food product 10 by consumers. Food product 10 may be similar to and share many features of food product 110, except that additive 18 is applied to a surface of the casing and/or component 12 rather than as part of a coextruded thin layer of meat. Food product 10 may be water and/or oven cooked, and may be water and/or brine chilled at one or more stages during the production of food product 10.

In one embodiment, food component 12 may be any of a variety of food types, including meat-based food components, non-meat-based food components, a combination thereof, etc. In some embodiments, food component 12 may have a consistency such that it may be "stuffed" or extruded into casing 14. Food component 112 shown in FIGS. 1-2 may share any or all of the features of food component 12.

Casing

In one embodiment, casing 14 may be made from a plastic or polymer film such as a polyester, polyamide, polyolefin, and the like. According to various other embodiments, casing 14 may be a cellulose material, a collagen material, a natural material, a fibrous material, a combination of plastic, polymer, or other casing materials, etc. Casing 14 may act as a "barrier" (e.g., a water barrier, gas barrier, etc.) between food component 12 and the exterior environment. Casing 14 may also be permeable to allow the transfer of water, gas, etc. between food component 12 and the exterior environment. In other embodiments, casing 14 may be a hydrophilic (e.g., tending to absorb and/or attract moisture from the surroundings) and/or a hydrophobic (e.g., tending to repel and/or not absorb moisture from the surroundings) material. Casing 14 may be formed from flat stock of film material (e.g., using the Polyclip TSA 120 in combination with the ICA 8700 clipping unit). Casing 14 may also be provided in a tubular and/or shined form. Casing 114 shown in FIGS. 1-2 may share any or all of the features of casing 14.

Additive

In various embodiments, additive 18 (e.g., seasoning, flavoring, spice, coloring, smoke, particulate, aroma, antimicrobial agent, fruit stuffs, vegetative blend, dough, meats, non-meats, slurry of liquid carrying other components, combinations thereof, etc.) may include a liquid, a solid, a paste, a film, or any combination thereof. In some embodiments, additive 18 may include a carrier configured to carry one or more spices, flavorings, etc. For example, additive 18 may be, or include a thickened and/or "sticky" liquid produced through use of one or more thickeners such as starches, gums, solid thickeners, hydrocolloids, fats, oils, polymers, proteins, formation of an emulsion, etc., such that when applied to a surface of casing 14 the additive tends to "stick" or adhere to the surface of the casing. The thickeners may provide a higher melting point for the additive coating and/or "enrobe" the additive within the coating to delay release of the additive to the food component. In some embodiments, additive 18 may be a solid material such as a dry powder (e.g., a dry seasoning mixture, etc.). In yet other embodiments, additive 18 may be provided on or as part of a film material such that the additive and/or the film may be applied to food component 12 or casing 14. For example, a starch may be used to provide a film material containing smoke, color, etc.

According to various embodiments, additive 18 may include one or more of a liquid smoke flavoring, a color additive, one or more food spices or other flavorings, etc. In other embodiments, a liquid smoke and/or coloring additive may be mixed with a food grade shellac or other thickener to improve adhesion of the additive to the casing material. Additives 18 and 118 may share some or all of the same features.

Food Product Production

Referring now to the FIGURES generally, an overview of one or more exemplary processes for producing a food product will be discussed. Some food products are manufactured by stuffing a food component such as food component 12 (e.g., a meat or soy dough) into a casing such as casing 14 formed from a film such as barrier film 13. Casing 14 may be provided to a manufacturing cell as a previously-formed tubular casing, or provided to the manufacturing cell as a flat sheet of film that is formed into a tubular shape just before the dough is stuffed. A roll of film 13 is shown in FIG. 5 according to an exemplary embodiment.

Figure 5:
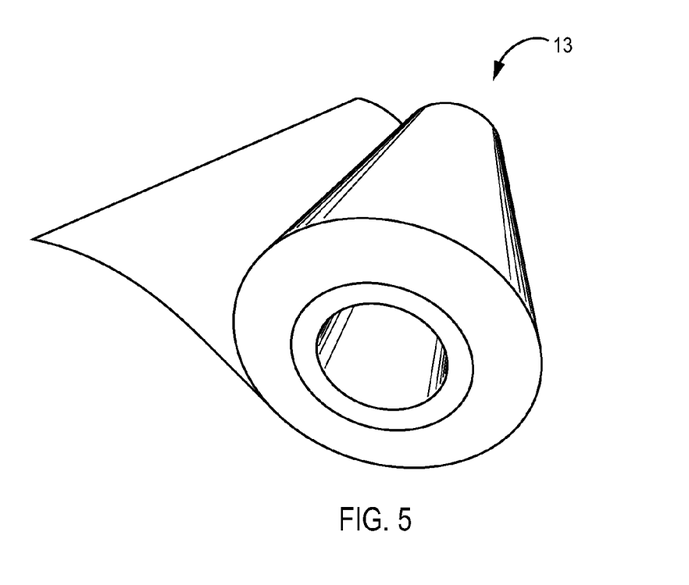
FIG. 5 is an illustration of a sheet of film in a rolled form according to an exemplary embodiment.
Figure 6:
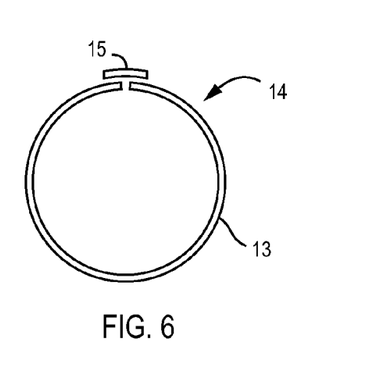
FIG. 6 is a cross-section schematic view of a tubular casing formed from a roll of film and sealed according to an exemplary embodiment.
Figure 7:
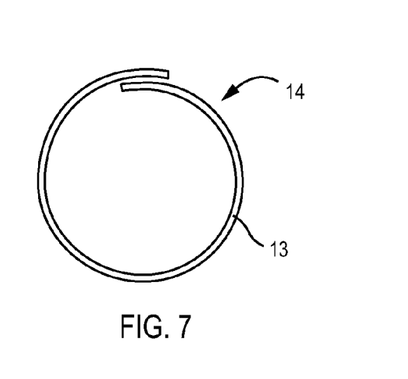
FIG. 7 is a cross-section schematic view of a tubular casing formed from a roll of film and sealed according to another exemplary embodiment.

As shown in FIG. 5, when casing 14 is converted or formed from a flat sheet at the manufacturing cell, barrier film 13 is supplied as a roll of the barrier film. The flat sheet of film 13 is unrolled from the roll and formed into a round or tubular casing by bringing together and bonding the outer edges (e.g., by a heat seal, an adhesive tape, etc.) of film 13. For example, FIG. 6 shows an exemplary embodiment of a casing formed from a flat sheet of film by utilizing a separate tape and/or adhesive 15 to seal casing 14 into a tubular form. FIG. 7 shows an exemplary embodiment of a casing formed by overlapping and sealing opposite edges of a film. The edges may be sealed together using any suitable means, including heat sealing, tape, adhesives, and/or a combination thereof.

Figure 8:
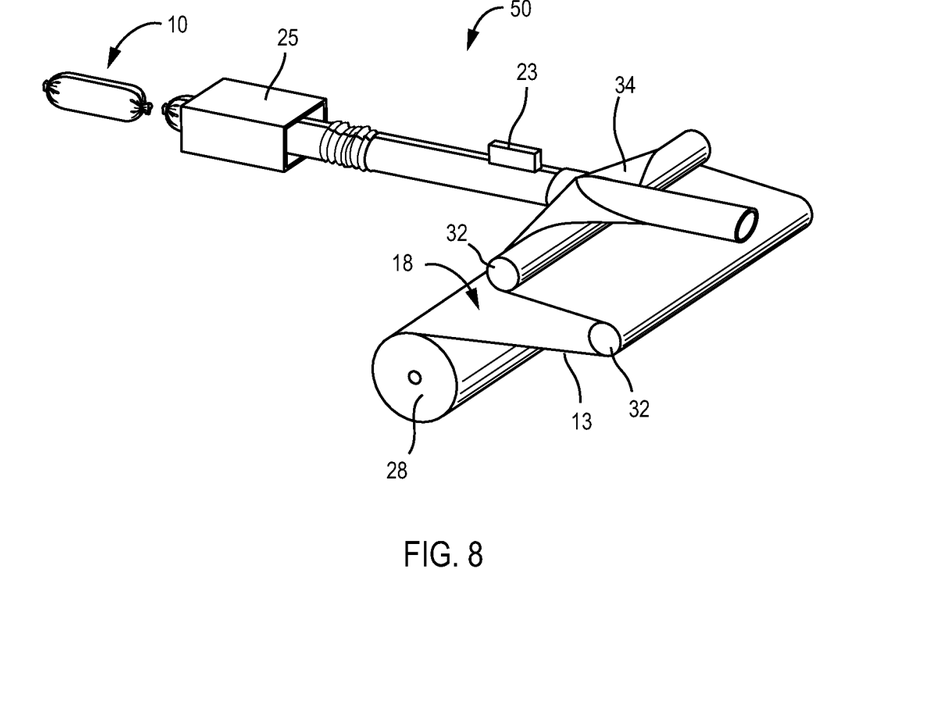
FIG. 8 is a schematic representation of a system utilized in the production of a food product according to an exemplary embodiment.
Figure 9:
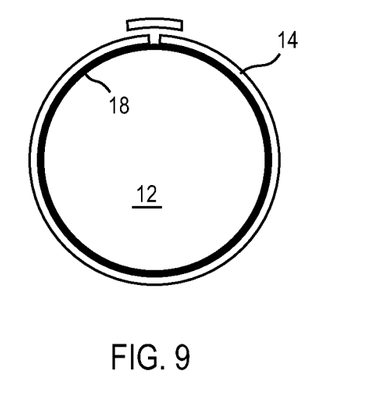
FIG. 9 is a cross-section schematic view of a tubular casing having an additive applied to a surface of the casing according to an exemplary embodiment.

Referring to FIG. 8, a schematic representation of an exemplary embodiment of a system 50 for implementing the process of forming a tubular plastic sheet or casing just before being stuffed with a food component is shown. As shown in FIG. 8, film 13 is supplied on a roll 28 and then transferred via a number of intermediate rollers 32 to a forming shoulder 34. The forming shoulder 34 forms the tubular shape of the casing, after which the edges of the film may be sealed together (e.g., using any suitable method, including those discussed with respect to FIGS. 6-7) to form the casing. Once the tubular shape of the casing is formed, the casing may be stuffed with a food component that travels through a stuffing horn (e.g., a pipe, tube, etc. as shown e.g., in FIGS. 19-21), and individual food products may be cut and sealed from the continuous length of casing utilizing a sealing device 23 and a cutting/clipping device 25. As shown in FIG. 8, according to some embodiments, film 13 may be drawn from roll 28 to form casing 14 as food products 10 are produced (e.g., continuously). According to other embodiments, casing 14 may be preformed and "shirred" (e.g., bunched together, etc.) on, for example, the outer surface of a stuffing horn through which a dough component is passing, such that as the dough exits from the interior of the stuffing horn the casing is pushed off of the exterior of the stuffing horn.

In some embodiments, additive 18 may be applied to casing 14 generally uniformly or in a manner such that the exterior of the food component has a generally uniform appearance, while in other embodiments, additive 18 may be applied to casing 14 generally non-uniformly or in a manner such that the exterior of the food component may be non-uniform, blotchy, or otherwise uneven in appearance, which may provide a more natural or otherwise preferred appearance to the food component.

In some embodiments, additive 18 may be provided on a surface of casing 14 at one or more points during the process shown in FIG. 8 using any of the additive application devices or methods discussed herein. For example, additive 18 may be applied to a surface of the roll of barrier film 13 with the intent of the additive being transferred to food component 12 when encased by casing 14. In some embodiments, additive 18 is applied to the film/casing "in-line" during the manufacturing process (e.g., as part of a continuous production process) at a point between unrolling film 13 from a supply roll 28 and stuffing the food component into the tubular casing. For example, in one embodiment, additive 18 is applied after formation of casing 14 and prior to stuffing food component into casing 14. Such an "in-line" continuous technique may provide various benefits over more traditional approaches, where providing multiple or different additives for different food products may require changing the supply rolls of barrier film for each product. Such traditional approaches typically require a large inventory of supply rolls and significant labor effort to change over rolls of film for each product line. Furthermore, significant cost savings may be realized by delivering additives in an "in-line" fashion to flat films, rather than having to purchase casings impregnated with desired additives.

As such, various embodiments disclosed herein are directed to a system and method for applying an additive to a food product casing when the casing is formed at the manufacturing cell (e.g., continuously, or "in-line" with the processing at the manufacturing cell). For example, as discussed above, additive 18 may be applied to film 13 after unwinding the film from the supply roll and before food component 12 is introduced into casing 14. According to various alternative embodiments, additive 18 may be applied to the film/casing via spraying, coating, brushing, or the like, as discussed in greater detail below. The additive is applied to the surface of the film that is in contact with the food component, and the additive "sticks" or adheres to the film by a glue, starch, gum, electro static charge, surface tension, pressure, or any of a variety of other techniques, as discussed in greater detail below. According to various alternative embodiments, the additive may be delivered in a single step or in multiple steps (e.g., application of an adhesive to the film, then application of the additive to the adhesive). The process of applying or incorporating an additive into a food product is discussed in greater detail below. In some embodiments, an additive may be provided by way of a coextrusion process as described with respect to FIG. 2. For example, as additive and/or carrier material may be coextruded over the top of a base food product. The additive and/or carrier may include any combination of the additive and carrier materials disclosed herein.

Techniques for Adding Additive to Casing:

According to various embodiments, additive 18 may be delivered to casing 14 and/or food component 12 using a variety of methods, including roll or rotary printing, spraying, brushing, sifting, laminating, using one or more of a variety of adhesives, and the like. Various exemplary embodiments illustrating application of an additive to a surface of a casing and/or food component are discussed below in greater detail. The various methods disclosed herein facilitate application of the additive to the food product/casing, release of the additive from the casing, transfer of the additive from the casing to the food product during cooking of the food product (and not, for example, prior to cooking), and/or transfer of the additive to only the outer portion of the food product.

Figure 10A:
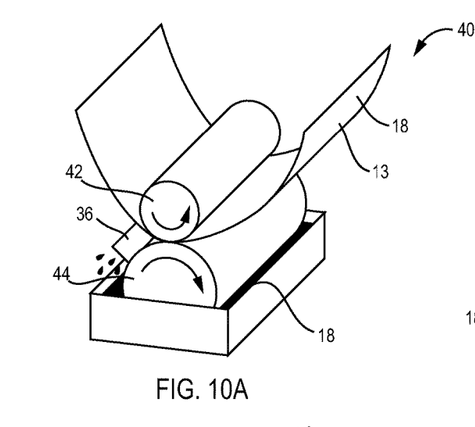
FIG. 10A is a schematic representation of a printing or rolling process according to an exemplary embodiment.
Figure 10B:
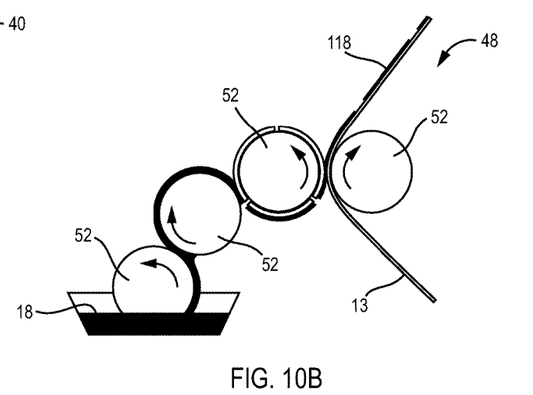
FIG. 10B is a schematic representation of a printing or rolling process according to another exemplary embodiment.
Figure 11:
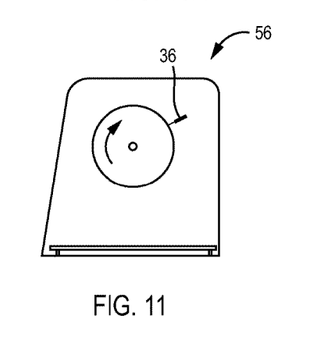
FIG. 11 is a schematic representation of a printing or rolling process according to an exemplary embodiment.
Figure 12:
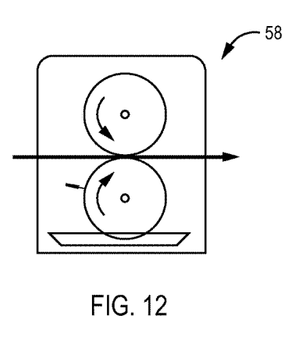
FIG. 12 is a schematic representation of a printing or rolling process according to an exemplary embodiment.
Figure 13:
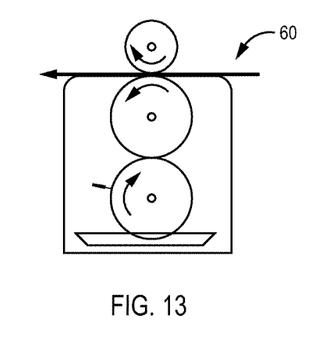
FIG. 13 is a schematic representation of a printing or rolling process according to an exemplary embodiment.

In some embodiments, additive 18 may be applied to film 13 using a roll, rotary, or other printing process. For example, in one embodiment, a gravure printing process 40 using one or more rollers 42, 44 may be utilized, as shown in FIG. 10A according to an exemplary embodiment. Alternatively, a flexographic roll printing process 48 using rollers 52 may be utilized, as shown in FIG. 10B according to an exemplary embodiment. Generally, in rotary printing a cylinder picks up ink (e.g. additive coating) from a fountain, the ink is set to a specific thickness on a roller, and the ink is transferred to the film. A blade 36 may be used to control the thickness of the additive coating. Various types of roller systems may be utilized, including a single roll system 56 (FIG. 11), a two roll direct system 58 (FIG. 12), or a three roll offset system 60 (FIG. 13). Other types of roller/printing systems may be used according to various other exemplary embodiments.

Figure 14:
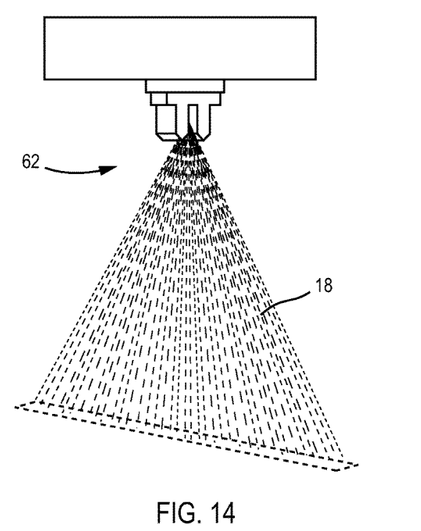
FIG. 14 is a schematic representation of a spray process according to an exemplary embodiment.
Figure 15:
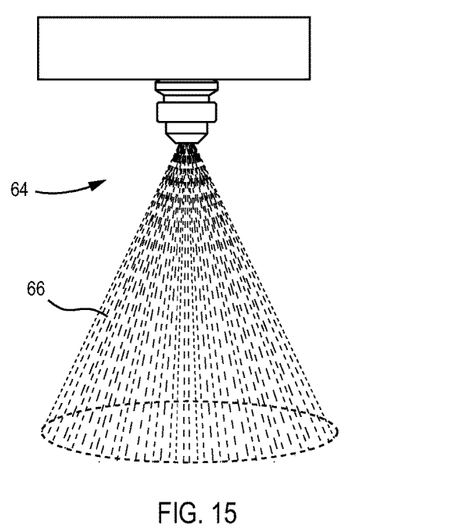
FIG. 15 is a schematic representation of a spray process according to another exemplary embodiment.

In some embodiments, additive 18 may be applied to film 13 and/or food component 12 using a spray process. For example, a variety of spray devices with varying nozzle types may be utilized (e.g., a flat spray nozzle, an air atomizing nozzle, ultra-sonic nozzle, rotary atomization applicator, etc.) as shown in FIGS. 14-15. FIG. 14 shows a spray device 62 configured to provide additive 18 to a casing material in a flat spray. FIG. 15 shows a spray device 64 (e.g., an atomizer) configured to provide a generally circular spray pattern. The sprayer may be oriented such that an annular spray pattern is provided on an inner surface of a tubular casing. Additive 18 may comprise a quick drying liquid that is configured to at least partially dry and provide a substantially dry and/or tacky additive layer on the surface of casing 14 after spraying and prior to casing 14 receiving the food component. In yet further embodiments, in order to maintain the stability of a liquid additive (e.g., a thickened liquid), the liquid additive may be maintained at a relatively hot temperature and subsequently sprayed in a relatively cold temperature environment. In some embodiments, additive 18 is sprayed on prior to or during stuffing of the food product into the casing, while in other embodiments, additive 18 may be sprayed on after the casing is removed.

In some embodiments, additive 18 may be applied to film 13 and/or food component 12 using a brush process (e.g., utilizing a conventional paint brush, utilizing an automated brush application system, etc.). Alternatively, additive 18 may be applied using a flood coating process (e.g., FIG. 21), wherein the casing may be formed in a tubular shape and filled with and/or dipped in a bath of liquid additive. The thickness of the resulting additive coating is controlled to provide proper adhesion and to minimize smearing.

Figure 16:
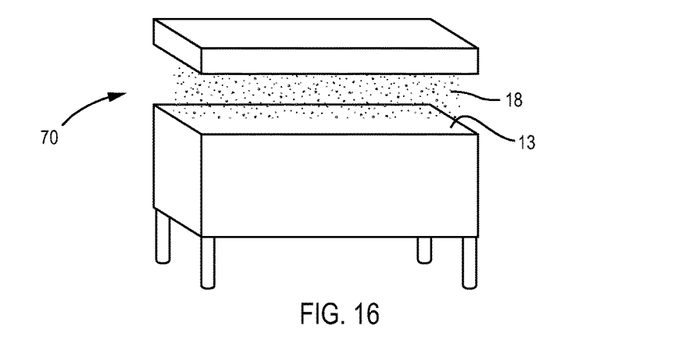
FIG. 16 is a schematic representation of a sifting or metering process according to an exemplary embodiment.

In some embodiment, additive 18 may be applied to film 13 and/or food component 12 using a sifting or metering process such that, for example, powdered materials (e.g., powdered seasonings, spices, etc.) may be sifted onto the film. FIG. 16 shows an exemplary embodiment of a device 70 that may be utilized to sift additive materials 18 onto a film such as film 13. In some embodiments, an adhesive may first be applied to the film and/or a charged film may be used, to improve the adherence of the sifted additive to the film.

Figure 22:
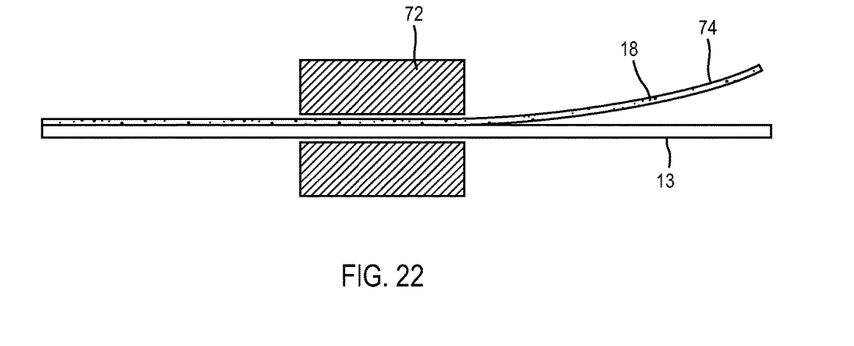
FIG. 22 is a schematic representation of a lamination process according to an exemplary embodiment.

In some embodiments, additive 18 may be applied to film 13 using one or more lamination processes. For example, in some embodiments (see FIG. 22), additive 18 may be provided on a film material 74 (e.g., an additive film), and the film 13 and the additive film may be laminated together using a lamination device 72 and/or a food-grade adhesive, heat, and/or other suitable methods. The additive film may be produced using any suitable process, including casting, extrusion, and the like.

According to various alternative embodiments, the various methods of applying additive 18 using the various additive application devices discussed herein may be used at different stages of production of food products such as food product 10. For example, according to one embodiment, the additive may be applied to the casing after a film is taken off the supply roll, but before or as the resulting casing is stuffed with a food component. The additive may be applied before and/or after the film is formed into a tubular shape of the casing. In other embodiments, the additive may be applied immediately prior to the stuffing step.

In some embodiments, a shellac may be applied to the casing (e.g., via a coating, spraying, brushing, or other process), and dry powder smoke additive applied (e.g., sifted, etc.) to the layer of shellac. In other embodiments, an additive liquid is sprayed onto the casing (e.g., a low to medium viscosity liquid), or alternatively, a flood coat including the additive may be applied (e.g., in a metered fashion to limit coating thickness) to the casing. A shellac may also be mixed with the additives and/or other components to make a sticky liquid that may be applied to the casing.

Film Properties and Composition:

According to various embodiments, prior to receiving additive 18, film 13 and/or casing 14 (or in some embodiments, casing 114) may be prepared using one or more of a variety of techniques. In general, the techniques are intended to facilitate initial adhesion of the additive to the surface of the film, retention (at least partially) of the additive to the film during stuffing of the food component into the casing, and subsequent transfer of at least some of the additive from the surface of the casing to the food component prior to consumption of the food product by consumers. Various methods for preparing a film and/or casing for receipt of an additive are discussed below. It should be noted that other methods may be utilized that are not specifically disclosed herein.

Figure 17:
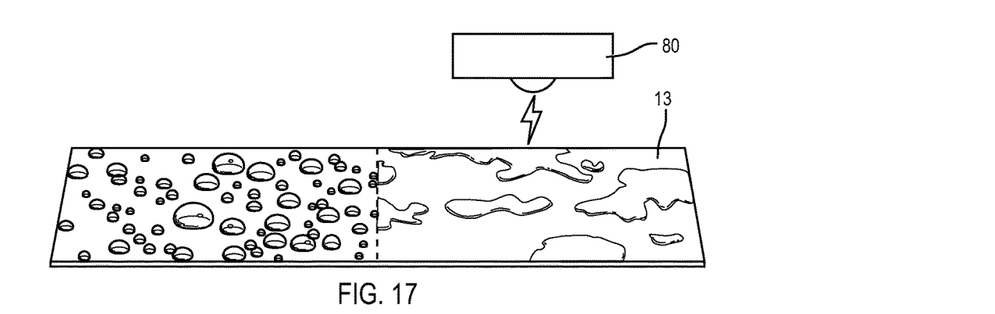
FIG. 17 is a schematic representation of a corona treatment process according to an exemplary embodiment.

In some embodiments, a surface treatment such as a corona or air plasma treatment may be utilized to prepare the casing surface. A corona treatment may be utilized that improves the bonding characteristics of the film (e.g., increases the surface energy of the film so that it is measurably higher than the additive being applied to the film). FIG. 17 illustrates the benefits of utilizing a corona device 80 on the surface of film 13 to promote adhesion to the surface of the film. During the corona treatment, electrons are accelerated into the surface of the film (e.g., a plastic), causing the long molecular chains to rupture, thereby producing a multiplicity of open valences. The ozone from the discharge creates an oxygenation, which in turn forms new carbonyl groups with higher surface energy.

In some embodiments, a scoring, scuffing, and/or similar treatment may be utilized to prepare the surface of the casing. For example, device 80 shown in FIG. 17 may be or include a laser device that may be utilized to provide laser perforations, scores, or the like in the film 13/casing 14. In other embodiments, an abrasive may be used to roughen and improve the adhesive properties of the film/casing. In some embodiments, such surface treatments may modify the surface properties to also enable wetting of the film.

In some embodiments, an adhesive may be utilized to improve adhesion of the additive to the film/casing. For example, a food-safe adhesive material may be utilized to provide "stickiness" to the surface of the casing.

In some embodiments, a primer layer may be applied to the surface of the film/casing using one or more of the devices shown herein or other suitable devices. For example, in some embodiments, a non-woven or woven, cellulose primer layer may be laminated or adhered to the film. In other embodiments, a liquid primer may be sprayed, rolled, etc. onto the film. These primer layers may be utilized to adhere to and/or absorb an additive such as a color, smoke, or other type of additive. In some embodiments, the primer layer may be laminated to the film (e.g., a water-barrier plastic film).

In some embodiments, the film may be charged to form a temporary bond of the additive to the surface of the casing. In some embodiments, the film forming the casing may become charged as a result of rolling/unrolling the film from one or more rollers and/or passing the film over various rollers. In other embodiments, a dedicated charging system may be utilized. According to an exemplary embodiment, a no slip agent/anti-stat is used in manufacture of the film to decrease the amount of static discharge created by rolling/un-rolling/converting the film. When trying to generate a static charge, use of a no-slip/anti-stat may be omitted.

Figure 18:
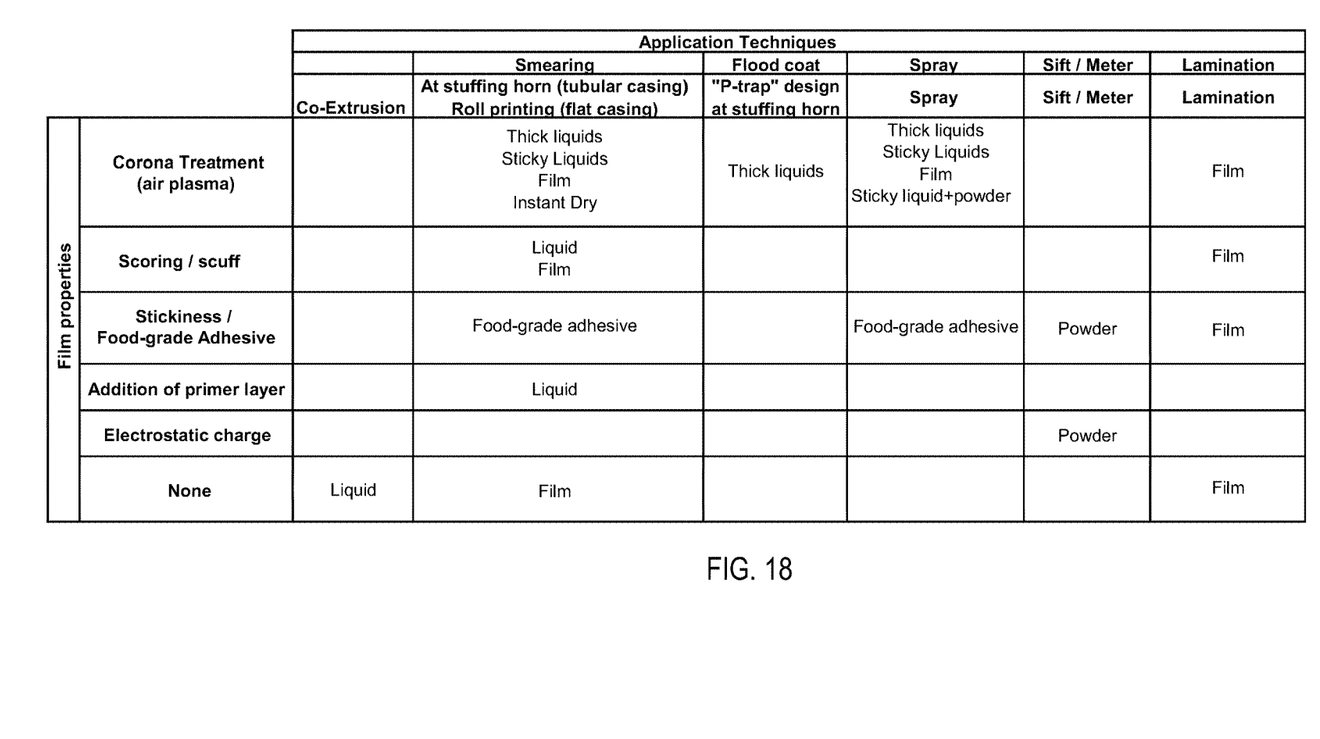
FIG. 18 is a table illustrating various film properties, application techniques, and additive properties according to various exemplary embodiments.

Referring to FIG. 18, a table of film properties and corresponding application techniques that may be used in delivering various types of additives (e.g., liquids, solids, films, etc.) to food products is shown according to an exemplary embodiment. It should be noted that the information shown in FIG. 18 is not exhaustive or limiting, and combinations of film properties and application techniques for various additives not identified in the table may be utilized according to any of the embodiments disclosed herein.

Other Features and Embodiments

Figure 19:
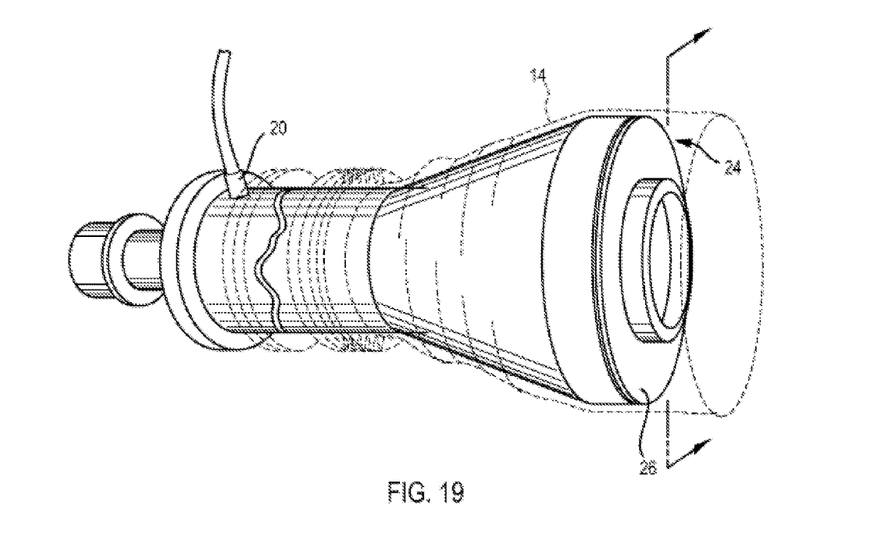
FIG. 19 is a perspective view of a device usable to produce food products according to an exemplary embodiment.
Figure 20:
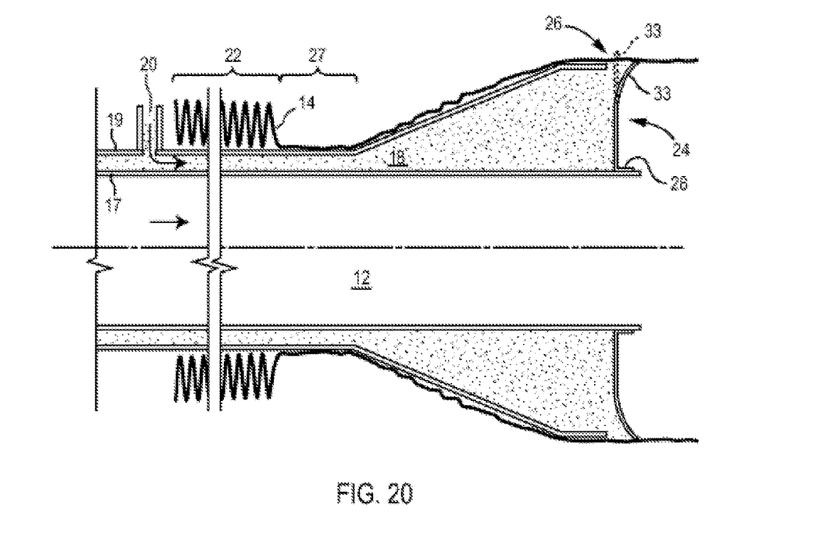
FIG. 20 is a cross-sectional view of the device of FIG. 19 taken along cross section line according to an exemplary embodiment.

Referring now to FIGS. 19-20, a portion of a system for applying an additive to a casing and/or food component is shown according to an exemplary embodiment. As shown in FIGS. 19-20, food component 12 passes through a stuffing horn 17. Stuffing horn 17 is a generally tubular member. An additive supply tube 19 is provided generally concentrically about stuffing horn 17. As shown in FIGS. 19-20, additive supply tube 19 is sized such that there is a gap between the outside surface of stuffing horn 17 and the inside surface of the additive supply tube 19 along some or all of stuffing horn 17. A channel or other feature 20 may be provided at a first end of supply tube 19 to introduce additive 18 into supply tube 19 such that additive 18 substantially surrounds the circumference of stuffing horn 17. A pump may be used to supply the additive to supply tube 19. Casing 14 is provided to the outside of supply tube 19. In some embodiments, a casing storage zone 22 and a tension zone 27 may be provided along a portion of the length of stuffing horn 17. In some embodiments, the casing in zone 22 may be shined. Tension zone 27 may be formed in a variety of ways, including tension being generated via a vacuum created between the casing and the stuffing horn, by a ring applying pressure on the outside of the casing. A second end of supply tube 19 may be provided with an outlet portion 24 where the outer diameter of supply tube 19 increases to the diameter of the casing as supply tube 19 reaches the end of stuffing horn 17. An annular gasket or seal 26 extends radially from stuffing horn 17 to seal the outlet portion 24 of supply tube 19.

As food component 12 is pushed through the stuffing horn, food component 12 exerts pressure on the casing, pushing the casing forward. As the casing is drawn forward, the casing exerts pressure on annular gasket 26 (e.g., portion 33). In some embodiments, additive 18 may be pumped through supply tube 19 using a pump device (not shown). Gasket 26 is formed such that the upper, or outer portion 33 of gasket 26 (e.g., the portion farthest away from the stuffing horn) tends to flex outward from outlet portion 24 of supply tube 19, such that gasket 26 flexes and permits additive 18 to be pumped out of supply tube 19 and onto the inner surface of casing 14 as casing 14 moves beyond the enlarged-diameter outlet portion 24 of supply tube 19. As shown in FIG. 20, gasket 26 may extend beyond the perimeter of outlet portion 24 and casing 14, such that when gasket 26 is flexed, gasket 26 tends to act like a "putty knife" to apply (e.g., smear, etc.) additive 18 onto the inner surface of casing 14. As food component 12 leaves stuffing horn 17, food component 12 tends to expand radially outward toward casing 14, such that food component 12 also comes in contact with additive 18. As an alternative or in addition to utilizing a gasket, the stuffing horn may gradually increase in diameter to substantially meet additive supply tube 19, leaving a small orifice for the additive to exit and be smeared onto the interior of the casing (e.g., such that the stuffing horn and additive supply tubes are both cone-shaped at the exit area). In some embodiments, the stuffing horn and additive supply tube may be configured such that the outlet for the additive is adjustable in size. For example, the outlet portion of the stuffing horn and the outlet portion of the additive supply tube may be moveable relative to each other to adjust the size of the outlet for the additive.

In some embodiments, a food product travels through the stuffing horn, and an additive is supplied to the additive supply tube. A gasket or seal 26 provided at the outlet portion 24 applies the additive to the casing. The gasket may act like a putty knife to "smear" the additive on the inside of the casing. It should be noted that the components shown in FIGS. 19-20 are for illustrative purposes only, and the size and shape of the components may be varied to suit a particular application. Furthermore, one or more of the features illustrated may be utilized in combination with a system such as that shown and illustrated in FIG. 2 herein. All such combinations of features are to be understood to be within the scope of the present disclosure.

Figure 21:
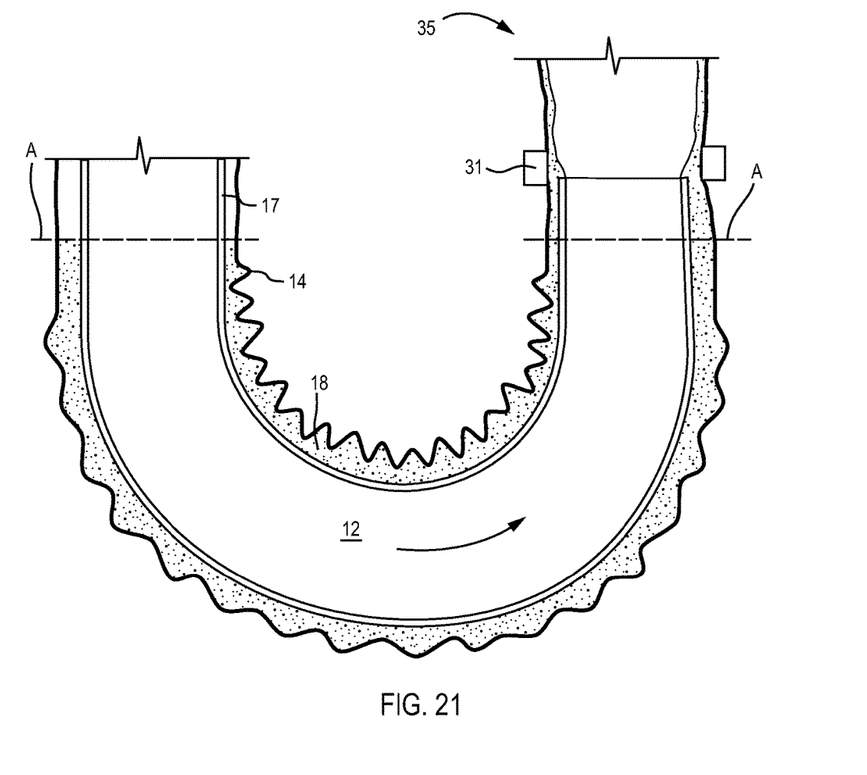
FIG. 21 is a cross-sectional view of a device usable to produce food products according to an exemplary embodiment.

Referring to FIG. 21, a portion of a device for applying an additive to a casing and/or food component is shown according to another exemplary embodiment. As shown in FIG. 21, stuffing horn 17 may have a "U"-shape, and casing 14 may extend about stuffing horn 17 along the U-shape of stuffing horn 17. Additive 18 is introduced between stuffing horn 17 and casing 14. Additive 18 may be provided as part of a fluid (e.g., a liquid, paste, etc.), such that additive 18 tends to settle toward the bottom of the U-shape (e.g., such that the additive extends up to line A-A shown in FIG. 18). A ring 31 (e.g., a metering device, etc.) may be provided to control the amount of additive applied to casing 14. In this way, the system shown in FIG. 21 acts such that a desired level of additive 18 may be maintained. Stuffing horn 17 remains stationary, and casing 14 is pushed off stuffing horn 17 at an outlet portion 35. As casing 14 travels adjacent stuffing horn 17 (e.g., along the "U"), additive 18 coats the inside surface of casing 14, such that casing 14 is appropriately coated with additive 18 when food component 12 is introduced into casing 14 at outlet portion 35 shown in FIG. 21.

Because the system in FIG. 21 may rely on gravity to maintain additive 18 at the proper level, the system may be operable without the use of a separate pump to force additive 18 along stuffing horn 17 and onto casing 14. Rather, a pump may be used to provide additive 18 to the area between stuffing horn 17 and casing 14.

It should be noted that a wide variety of stuffing horn/additive supply tube sizes, casing types and sizes, and additive types may be utilized in connection with the embodiments shown herein. Furthermore, while various embodiments disclosed herein relate to applying an additive to a casing, into which a food component is then introduced, in various alternative embodiments, the additive may be applied to a food component (e.g., an outside edge of a meat-based food component, within a thin layer of meat carrier, etc.), which in turn makes contact with the casing. Further yet, in other embodiments an additive may be mixed with a thin meat layer that is coextruded with an inner layer (e.g., a meat or other layer) and provided within an outer casing.

It should be noted that the various food product techniques, additive application techniques, film properties, and other features disclosed herein may be combined in a variety of ways to arrive at desired food production system and/or food product.

For example, in one embodiment, first and second food products may be coextruded within an outer casing, and the second food product may comprises an additive such as seasoning, flavoring, coloring, and the like.

In another embodiment, a food product may be extruded through a stuffing horn and received within an outer casing. An additive may be applied to an inner surface of the casing prior to the casing receiving the food product. The additive may be applied to the casing such that the additive tends to not smear as the food product is introduced into the casing, and at least some of the additive is subsequently transferred to the food product.

In some embodiments, a system for making a food product includes means for providing a food component, means for providing a casing material, means for applying an additive to the casing material; and means for introducing the food component into the casing material such that at least some of the additive is transferred to the food component.

Another embodiment relates to an apparatus for delivering an additive to a food product, the apparatus comprising a stuffing horn; a casing configured to receive a food component from the stuffing horn; and an additive delivery device configured to deliver an additive to the casing and/or the food component, the additive delivery device comprising a supply tube extending about and being generally concentric with the stuffing horn; and a gasket provided at an outlet portion of the supply tube, the gasket being flexible to apply the additive to an inner surface of the casing and/or the outer surface of the food component.

Another embodiment relates to an apparatus for delivering an additive to a food product, the apparatus comprising a U-shaped stuffing horn; a casing provided on the stuffing horn over at least a portion of the U-shape; an additive provided between the stuffing horn and the casing along at least a portion of the U-shape; wherein a food component is introduced into the casing from the stuffing horn, and wherein an inner surface of the casing is at least partially coated with the additive prior to the food component being introduced into the casing.

It should be noted that the systems and methods for delivering an additive shown and described herein may provide reduction of smearing of the smoke/color during or other additive stuffing (which may lead to unacceptable product), improved retention of additive, improved transfer of additive properties (e.g., smoke, color, etc.) to meat during processing (which results in consistent coverage and an intensity similar to that of traditional methods), improved adhesion to the meat, and retention of film water barrier properties (e.g. no visible holes, punctures, wear, etc.).

Furthermore, the various systems and methods may increase the choices with respect to vendors of casing material, reduce casing costs, reduce the need for dedicated sealing tapes, reduce inventory, and reduce the physical size of the film rolls (e.g., resulting from a reduced thickness film that in turn results in a reduced thickness roll).

It is important to note that the construction and arrangement of the elements of the systems and methods as shown in the exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the embodiments. Accordingly, all such modifications are intended to be included within the scope of the present disclosure as defined in the appended claims. The order or sequence of any process or method steps may be varied or re-sequenced according to alternative embodiments. Other substitutions, modifications, changes, and/or omissions may be made in the design, operating conditions, and arrangement of the exemplary embodiments without departing from the spirit of the present disclosure.

What is claimed is:

1. A method of making a food product in a continuous in-line production process, the method comprising:
   applying, by an additive application device, an additive to a surface of a sheet of a casing material while the sheet of casing material is being unrolled from a roll of casing material;
   while the sheet of casing material is attached to the roll of casing material, transferring the sheet of casing material to a forming shoulder via an intermediate roller that substantially changes a direction of travel of the sheet of casing material and such that the forming shoulder receives the sheet of casing material after the additive application device applies the additive to the surface of the sheet of casing material, wherein the intermediate roller is separate from the additive application device;
   forming, by the forming shoulder, the sheet of casing material into a tubular shape with the additive on an interior surface of the tubular shape;

longitudinally sealing the tubular shaped casing material;

after longitudinally sealing the tubular shaped casing material, extruding a food component such that the food component is received within the tubular shaped casing material plus additive and at least a portion of the additive remains in a liquid form as the food component is received within the tubular shaped casing material plus additive; and transversely cutting the sealed tubular shaped casing material with the extruded food component to detach part of the sealed tubular shaped casing material from the casing roll, wherein each of the above steps is performed in the continuous in-line production process, wherein at least a portion of the additive is transferred from the casing material to the food component after the food component is received within the tubular shaped casing material plus additive and is consumable with the food component.

2. The method of claim 1, wherein the additive application device includes a sprayer, and wherein applying the additive to the surface of the sheet of casing material comprises spraying liquid additive onto the surface of the sheet of casing material via the sprayer.

3. The method of claim 1, wherein the additive is a tacky liquid having a viscosity such that the tacky liquid remains in a desired position on the casing material prior to forming the tubular shape and prior to the food product being received within the tubular shaped casing material plus additive.

4. The method of claim 1, further comprising processing the surface of the casing material prior to applying the additive to the surface of the sheet of casing material, the processing comprising at least one of:

applying a corona treatment to the surface of the sheet of casing material;

perforating, scoring, and/or roughening the surface of the sheet of casing material;

applying a primer to the surface of the sheet of casing material;

applying an adhesive to the surface of the sheet of casing material; and applying an electrostatic charge to the sheet of casing material.

5. The method of claim 1, wherein applying the additive comprises at least one of:

applying the additive to the surface of the sheet of casing material using one or more rollers;

brushing the additive onto the surface of the sheet of casing material;

sifting the additive onto the surface of the sheet of casing material; and coating a liquid additive onto the surface of the sheet of casing material.

6. The method of claim 1, wherein transferring the sheet of casing material to the forming shoulder further comprises transferring the sheet of casing material to the forming shoulder via the intermediate roller and a second intermediate roller that again substantially changes the direction of travel of the sheet of casing material.

7. The method of claim 6, wherein the additive is applied to the surface of the sheet of casing material before the sheet of casing material has contacted the second intermediate roller.

8. A method of making a food product, the method comprising:

unrolling a casing sheet from a casing roll;

applying, by an additive application device, an additive to the unrolled casing sheet;

transferring the casing sheet to a forming shoulder via an intermediate roller that substantially changes a direction of travel of the casing sheet and such that the forming shoulder receives the casing sheet after the additive application device applies the additive to the casing sheet, wherein the intermediate roller is separate from the additive application device, tubularly shaping the transferred casing sheet via the forming shoulder;

longitudinally sealing the tube shaped casing sheet;

after longitudinally sealing the tube shaped casing sheet, extruding a food component such that the tube shaped casing sheet, having the previously applied additive, receives the food component; and transversely cutting the sealed tube shaped casing sheet with the extruded food component to detach part of the sealed tube shaped casing sheet from the casing roll, wherein the unrolling, applying, transferring, forming, sealing, extruding, and cutting are performed as a continuous in-line production process while the casing sheet is attached to the casing roll.

9. The method of claim 8, wherein transferring the casing sheet to the forming shoulder further comprises transferring the casing sheet to the forming shoulder via the intermediate roller and a second intermediate roller that again substantially changes the direction of travel of the casing sheet.

10. The method of claim 9, wherein at least a portion of the applied additive is liquid when the tube shaped casing sheet receives the extruded food component.

11. The method of claim 10, wherein at least a portion of the liquid additive contacts, while still in liquid form, the extruded food component.

12. The method of claim 9, wherein the additive is applied to the unrolled casing sheet before the unrolled casing sheet contacts the second intermediate roller.

13. The method of claim 12, wherein the additive is applied to the unrolled casing sheet after the unrolled casing sheet contacts the first intermediate roller.

14. The method of claim 8, wherein after being unrolled from the casing roll, and at least until being transversely cut, the casing sheet is in constant motion.

15. The method of claim 14, wherein the tube shaped casing sheet travels along an exterior of a tube during the shaping, extruding, sealing, and cutting steps.

16. The method of claim 15, wherein the tube has a single longitudinal axis.

17. The method of claim 8, wherein the tube shaped casing sheet travels along an exterior of a tube at least until receiving the extruded food component.

* * * * *